US007876966B2

(12) United States Patent
Ojanpera

(10) Patent No.: US 7,876,966 B2
(45) Date of Patent: Jan. 25, 2011

(54) SWITCHING BETWEEN CODING SCHEMES

(75) Inventor: Juha Ojanpera, Nokia (FI)

(73) Assignee: Spyder Navigations L.L.C., Wilmington, DE (US)

( * ) Notice: Subject to any disclaimer, the term of this patent is extended or adjusted under 35 U.S.C. 154(b) by 1545 days.

(21) Appl. No.: 10/548,235

(22) PCT Filed: Mar. 11, 2003

(86) PCT No.: PCT/IB03/00884

§ 371 (c)(1), (2), (4) Date: Sep. 2, 2005

(87) PCT Pub. No.: WO2004/082288

PCT Pub. Date: Sep. 23, 2004

(65) Prior Publication Data

US 2006/0173675 A1 Aug. 3, 2006

(51) Int. Cl.
*G06K 9/36* (2006.01)
*H04N 7/12* (2006.01)
*G10L 19/02* (2006.01)

(52) U.S. Cl. .................. 382/232; 375/240.26; 704/203

(58) Field of Classification Search ................ 704/203; 375/240.26; 382/232
See application file for complete search history.

(56) References Cited

U.S. PATENT DOCUMENTS 5,416,603 A 5/1995 Suzuki et al.
5,752,222 A * 5/1998 Nishiguchi et al. .......... 704/201
6,029,134 A * 2/2000 Nishiguchi et al. .......... 704/268
6,134,518 A * 10/2000 Cohen et al. ................ 704/201
6,658,383 B2 * 12/2003 Koishida et al. ............ 704/229
7,454,330 B1 * 11/2008 Nishiguchi et al. .......... 704/224
2003/0035586 A1 2/2003 Chou et al.

FOREIGN PATENT DOCUMENTS

EP 0 524 625 A2 1/1993
EP 0 932 141 A2 7/1999
WO 98/19460 5/1998

OTHER PUBLICATIONS

"Restructured Audio Encoder for Improved Computational Efficiency" by Y. Wang et al, 108$^{th}$ AES Convention, Paris, France, Feb. 19-22, 2000.

(Continued)

*Primary Examiner*—Wenpeng Chen

(57) ABSTRACT

Methods and units are shown for supporting a switching from a first coding scheme to a Modified Discrete Cosine Transform (MDCT) based coding scheme calculating a forward or inverse MDCT with a window (h(n)) of a first type for a respective coding frame, which satisfies constraints of perfect reconstruction. To avoid discontinuities during the switching, it is proposed that for a transient frame immediately after a switching, a sequence of windows ($h_0(n),h_1(n),h_2(n)$) is provided for the forward and the inverse MDCTs. The windows of the window sequence are shorter than windows of the first type. The window sequence splits the spectrum of a respective first coding frame into nearly uncorrelated spectral components when used as basis for forward MDCTs, and the second half of the last window ($h_2(n)$) of the sequence of windows is identical to the second half of a window of the first type.

27 Claims, 5 Drawing Sheets

OTHER PUBLICATIONS

"High-Level Description for the ITU-T Wideband (7kHz) ATCELP Speech Coding Algorithm of Deutsche Telekom, Aachen University of Technology (RWTH) and France Telecom (CNET)" Geneva, Jan. 26-Feb. 6, 1998.
3GPP TS 26.190 V5.1.0 (Dec. 2001) 3rd Generation Partnership Project; Technical Specification Group Services and System Aspects; Speech Codec speech processing functions; AMR Wideband speech codec; Transcoding functions (Release 5).
"Analysis/Synthesis Filter Bank Design Based on Time Domain Aliasing Cancellation" by J.P. Princen et al, IEEE Trans. Acoustics, Speech, and Signal Processing, 1986, vol. ASSP-34, No. 5, Oct. 1986, pp. 1153-1161.
"The Modulated Lapped Transform, Its Time-Varying Forms, and Its Applications to Audio Coding Standards" by S. Shlien, IEEE Trans. Speech, and Audio Processing, vol. 5, No. 4, Jul. 1997, pp. 359-366.
"Sum-Difference Stereo Transform Coding" by J.D. Johnston et al, 1992 IEEE, pp. II-569-571.
"Why Binaural Cue Coding is better than Intensity Stereo Coding" by F. Baumgarte et al, Audio Engineering Society Convention Paper 5575, Munich, Germany, May 10-13, 2002.

* cited by examiner

SWITCHING BETWEEN CODING SCHEMES

CROSS-REFERENCE TO RELATED APPLICATION

This is the U.S. National Stage of International Application No. PCT/IB2003/000884 filed Mar. 11, 2003 and published in English on Sep. 23, 2004 under International Publication No. WO 2004/082288 A1.

FIELD OF THE INVENTION

The invention relates to a hybrid coding system. The invention relates more specifically to methods for supporting a switching from a first coding scheme to a second coding scheme at an encoding end and a decoding end of a hybrid coding system, the second coding scheme being a Modified Discrete Cosine Transform based coding scheme. The invention relates equally to a corresponding hybrid encoder, to a transform encoder for such a hybrid encoder, to a corresponding hybrid decoder, to a transform decoder for such a hybrid decoder, and to a corresponding hybrid coding system.

BACKGROUND OF THE INVENTION

Coding systems are known from the state of the art. They can be used for instance for coding audio or video signals for transmission or storage.

FIG. 1 shows the basic structure of an audio coding system, which is employed for transmission of audio signals. The audio coding system comprises an encoder 10 at a transmitting side and a decoder 11 at a receiving side. An audio signal that is to be transmitted is provided to the encoder 10. The encoder is responsible for adapting the incoming audio data rate to a bitrate level at which the bandwidth conditions in the transmission channel are not violated. Ideally, the encoder 10 discards only irrelevant information from the audio signal in this encoding process. The encoded audio signal is then transmitted by the transmitting side of the audio coding system and received at the receiving side of the audio coding system. The decoder 11 at the receiving side reverses the encoding process to obtain a decoded audio signal with little or no audible degradation.

Alternatively, the audio coding system of FIG. 1 could be employed for archiving audio data. In that case, the encoded audio data provided by the encoder 10 is stored in some storage unit, and the decoder 11 decodes audio data retrieved from this storage unit. In this alternative, it is the target that the encoder achieves a bitrate which is as low as possible, in order to save storage space.

Depending on the available bitrate, different coding schemes can be applied to an audio or video signal, the term coding being employed for both, encoding and decoding.

Speech signals have traditionally been coded at low bitrates and sampling rates, since very powerful speech production models exist for speech waveforms, e.g. Linear Prediction (LP) coding models. A good example of a speech coder is an Adaptive Multi-Rate Wideband (AMR-WB) coder. Music signals, on the other hand, have traditionally been coded at relatively high bitrates and sampling rates due to different user expectations. For coding music signals, typically transformation techniques and principles of psychoacoustics are applied. Good examples of music coders are, for example, generic Moving Picture Expert Group (MPEG) Layer III (MP3) and Advanced Audio Coding (AAC) audio coders. Such coders usually employ a Modified Discrete Cosine Transform (MDCT) for transforming received excitation signals into the frequency domain.

In recent years, it has been an aim to develop coding systems which can handle both, speech and music, at competitive bitrates and qualities, e.g. with 20 to 48 kbps and 16 Hz to 24 kHz. It is well-known, however, that speech coders handle music segments quite poorly, whereas generic audio coders are not able to handle speech at low bitrates. Therefore, a combination of two different coding schemes might provide a solution for filling-in the gap between low bitrate speech coders and high bitrate, high quality generic audio coders. The combination of a speech coder and a transform coder is commonly known as hybrid audio coder. A mode switching decision indicating which coder should be used for the current frame is made on a frame-by-frame basis.

In a hybrid coder, it is one of the main challenges to achieve a smooth transition between two enabled coding schemes. Abrupt changes at the frame boundaries when switching from one coder to another should be minimized, since any discontinuity will result in audible degradation at the output signal.

A smooth transition is particularly difficult to achieve when switching from a first coder, e.g. a speech coder, to an MDCT based coder.

MDCT based encoders apply an MDCT to coding frames which overlap by 50% to obtain the spectral representation of the excitation signal. For illustration, FIG. 2 shows four MDCT windows over time samples of an input signal, each MDCT window being associated to another one of consecutive, overlapping coding frames. As can be seen, the overlapping portion of the windows of two consecutive coding frames n, n+1 corresponds to half of the length of a coding frame.

FIG. 3 illustrates how discontinuities are caused when switching from an AMR-WB speech coder to an MDCT coder. Each frame of a signal can be encoded either by an AMR-WB encoder or by an MDCT transform encoder. At the decoder, first an inverse MDCT (IMDCT) is applied to all frames which were encoded by the MDCT based transform encoder, and then the original signal is reconstructed by adding the first half of a current frame to the latter half of the preceding frame. In case a first frame n was encoded by the AMR-WB encoder and the following frame n+1 by the MDCT based transform encoder, discontinuities will be present at the decoder side at frame n+1, since the overlap component from the preceding frame n is missing.

The overlap component is important for the reconstruction, since it contains the original windowed signal and in addition the time aliased version of the windowed signal.

As described by Y. Wang, M. Vilermo, et. al. in "Restructured audio encoder for improved computational efficiency", 108th AES Convention, Paris 2000, Preprint 5103, the MDCT works such that a signal sequence of 2N samples contains the following components: Between 0 and N−1 time samples of the original windowed signal plus the mirrored and inverted original windowed signal; between N and 2N−1 time samples of the original windowed signal plus the mirrored original windowed signal. The mirrored components are time aliases and will be canceled in the overlap-add operation.

In case the overlap component from the preceding frame is missing, the alias term cannot be canceled from the current frame n+1. This will result in audible degradation at the output signal.

In document "High-level description for the ITU-T wideband (7 kHz) ATCELP speech coding algorithm of Deutche Telekom, Aachen University of Technology (RWTH) and France Telekom (CNET)", ITU-T SQ16 delayed contribution D.130, February 1998, by Deutsche Telekom and France Telekom, it is, proposed to use a special transition window and an extrapolation when switching from a Code Excited Linear Prediction (CELP) coder to an Adaptive Transform Coder (ATC). The transition window enables the ATC to decode the last samples of a frame. The first samples are obtained by extrapolating the samples from the previous frames via an LP-filter. Such an extrapolation, however, might introduce discontinuities and artifacts especially in the case where the frame boundaries are at the onset of a transient signal segment.

SUMMARY OF THE INVENTION

It is an object of the invention to support a smooth transition between two coding schemes. It is in particular an object of the invention to support a smooth transition from a first coding scheme to a second coding scheme which constitutes an MDCT coding scheme.

For the encoding end of a hybrid coding system, a first method for supporting a switching from a first coding scheme to a second coding scheme is proposed. Both coding schemes code input signals on a frame-by-frame basis. The second coding scheme is a Modified Discrete Cosine Transform based coding scheme calculating at the encoding end a Modified Discrete Cosine Transform with a window of a first type for a respective coding frame, a window of the first type satisfying constraints of perfect reconstruction. The proposed first method comprises providing for each first coding frame, which is to be encoded based on the second coding scheme after a preceding coding frame has been encoded based on the first coding scheme, a sequence of windows. The window sequence splits the spectrum of a respective first coding frame into nearly uncorrelated spectral components when used as basis for forward Modified Discrete Cosine Transforms. Further, the second half of the last window of the sequence of windows is identical to the second half of a window of the first type. The proposed first method moreover comprises calculating for a respective first coding frame a forward Modified Discrete Cosine Transform with each window of the window sequence and providing the resulting samples as encoded samples of the respective first coding frame.

In addition, a hybrid encoder and a transform encoder component for a hybrid encoder are proposed, which comprise means for realizing the first proposed method.

For the decoding end of a hybrid coding system, a second method for supporting a switching from a first coding scheme to a second coding scheme is proposed. Both coding schemes code input signals on a frame-by-frame basis. The second coding scheme is a Modified Discrete Cosine Transform based coding scheme calculating at the decoding end an Inverse Modified Discrete Cosine Transform with a window of a first type for a respective coding frame and overlap-adding the resulting samples with samples resulting for a preceding coding frame to obtain a reconstructed signal. A window of the first type satisfies constraints of perfect reconstruction. The proposed second method comprises providing for each first coding frame, which is to be decoded based on the second coding scheme after a preceding coding frame has been decoded based on the first coding scheme, a sequence of windows. The window sequence would split the spectrum of a coding frame into nearly uncorrelated spectral components when used as basis for forward Modified Discrete Cosine Transforms, and the second half of the last window of the sequence of windows is identical to the second half of a window of the first type. The proposed second method moreover comprises calculating for a respective first coding frame an Inverse Modified Discrete Cosine Transform with each window of the window sequence and providing the first half of the resulting samples as reconstructed frame samples without overlap adding.

In addition, a hybrid decoder and a transform decoder component for a hybrid decoder are proposed, which comprise means for realizing the second proposed method.

Finally, a hybrid coding system is proposed, which comprises as well the proposed hybrid encoder as the proposed hybrid decoder.

The invention proceeds from the consideration that forward MDCTs using a window sequence instead of a single window for a respective transition coding frame can be employed at an encoding end for splitting the source spectrum into nearly uncorrelated spectral components. The same window sequence can then be used for inverse MDCTs at a decoding end. As a result, no overlap component from a preceding coding frame which is coded by some other coding scheme will be needed for a reconstruction of the transition frame. At the same time, the window sequence can satisfy the constraints of perfect reconstruction, if the second half of the window sequence is identical to the second half of the single windows employed for all other coding frames.

It is an advantage of the invention that it allows a smooth transition from a first coding scheme to an MDCT based coding scheme.

It is further an advantage of the invention that it does not require extrapolations during codec switching.

It is further an advantage of the invention that since a special MDCT window sequence takes care of the switching, also the overall operation of the coding system can be simplified.

Preferred embodiments of the invention become apparent from the dependent claims.

In an advantageous embodiment of the invention as well for the encoding end as for the decoding end, the shape of the windows of the first type is determined by a function, in which one parameter is the number of samples per coding frame. In the first half of a respective first coding frame at least one subframe is defined, to which a respective window of a second type is assigned by the window sequence, the shape of a window of the second type being determined by the same function as the shape of a window of the first type, in which function the parameter representing the number of samples per coding frame is substituted by a parameter representing the number of samples per subframe. It is understood that also a different offset is selected, since the window of the second type has to start off at a different position in the coding frame. In case more than one subframe is defined, the at least one subframe constitutes preferably a sequence of subframes overlapping by 50%. A window associated to the at least one subframe is overlapped respectively by one half by a preceding window and a subsequent window of the sequence of windows, the preceding window and the subsequent window having at least for the samples in the at least one subframe a shape corresponding to the shape of the window of the second type. The sum of the values of the windows of the window sequence is equal to ‘one’ for each sample of the coding frame which lies within the first half of the coding frame and outside of the at least one subframe. Finally, the values of the windows of the window sequence are equal to ‘zero’ for each sample which lies outside of the first coding frame.

While the second coding scheme has to be an MDCT coding scheme, the first coding scheme can be an AMR-WB coding scheme or any other coding scheme. The domain of the signal which is provided to the MDCT based coder can be the LP domain, the time domain or some other signal domain.

Further, the window of the first type can be a sine based window, but equally of any other window, as long as it satisfies the constraints of perfect reconstruction.

The invention can be employed for audio coding, e.g. for speech coding by the first coding scheme and music coding by the MDCT coding scheme. Moreover, it can be used in video coding to switch between different coding schemes. In video coding, the invention should be applied in a two-dimensional manner, in which first the rows are coded and then the columns, or vice versa.

The invention can be employed in particular for storage purposes and/or for transmissions, e.g. to and from mobile terminals.

The invention can further be implemented either in software or using a dedicated hardware solution. Since the invention is part of a hybrid coding system, it is preferably implemented in the same way as the overall hybrid coding system.

BRIEF DESCRIPTION OF THE FIGURES

Other objects and features of the present invention will become apparent from the following detailed description of an exemplary embodiment of the invention considered in conjunction with the accompanying drawings.

DETAILED DESCRIPTION OF THE INVENTION

Figure 1:
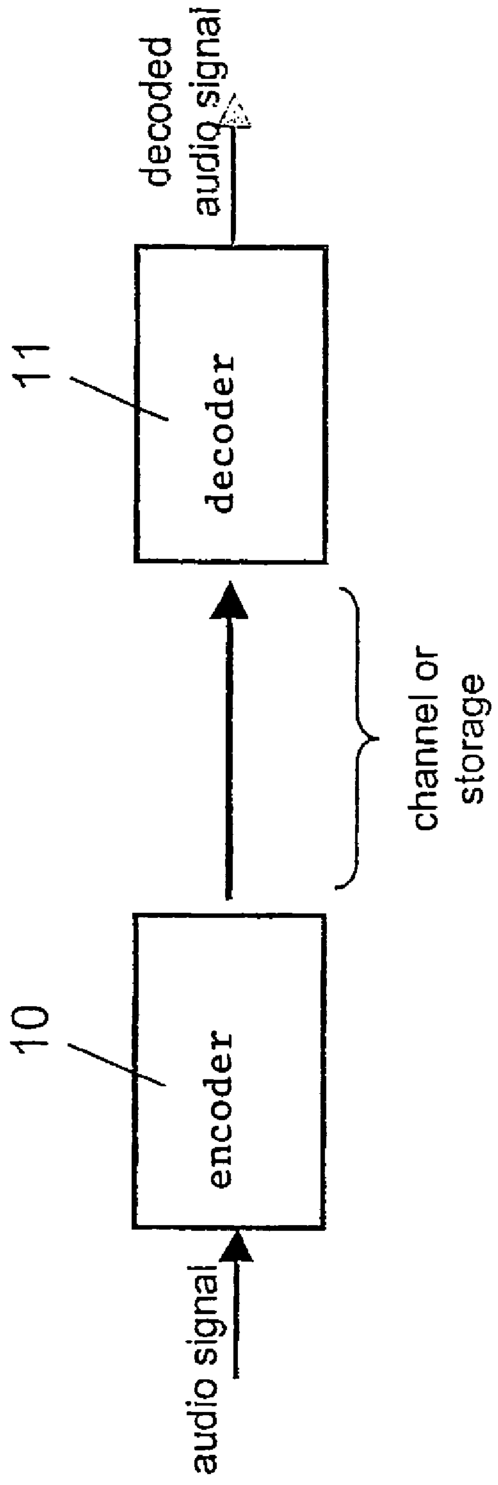
FIG. 1 (PRIOR ART)
FIG. 1 is a block diagram presenting the general structure of a coding system.
Figure 2:
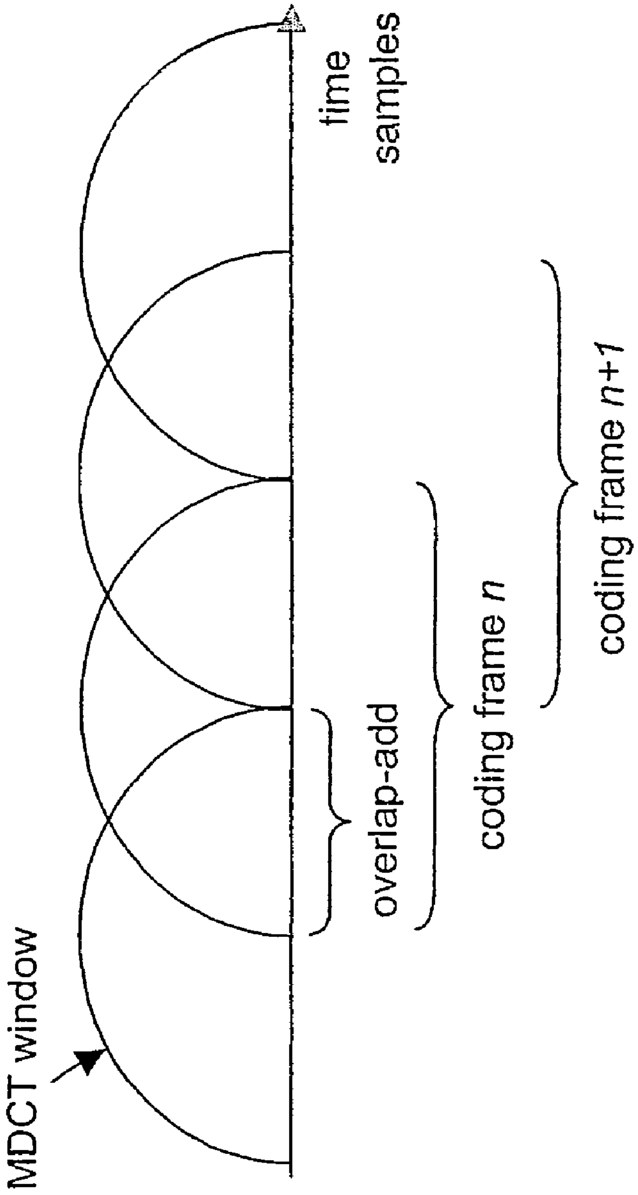
FIG. 2 (PRIOR ART)
FIG. 2 illustrates the functioning of an MDCT coder.
Figure 3:
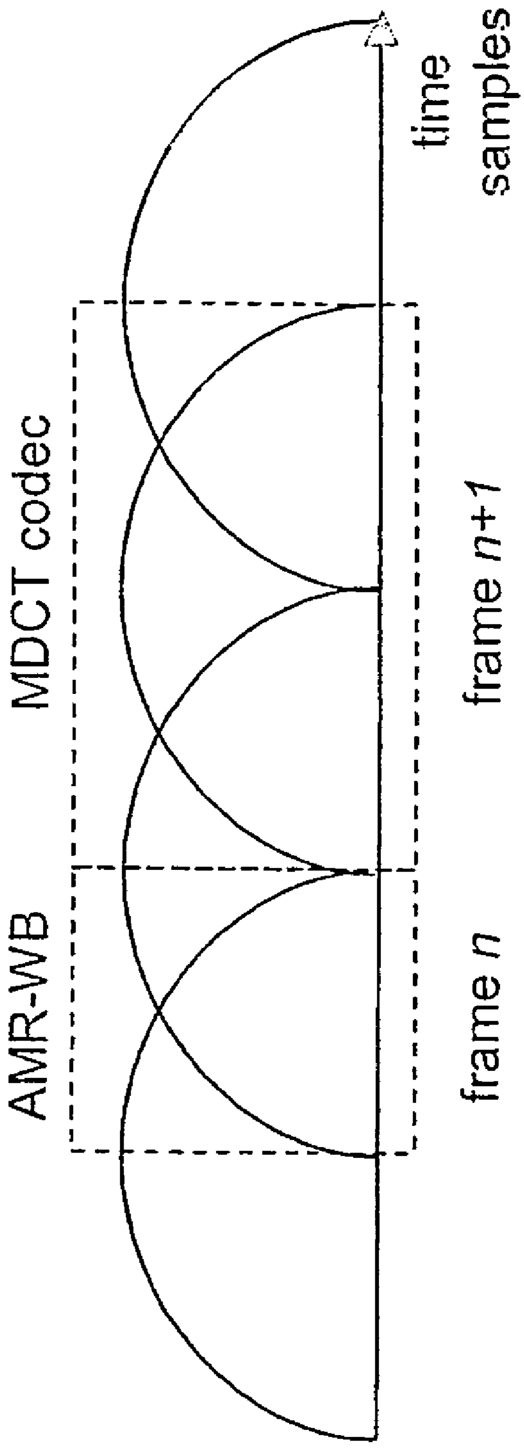
FIG. 3 (PRIOR ART)
FIG. 3 illustrates a problem resulting in a hybrid coding system employing an MDCT coding scheme.

FIGS. 1 to 3 have already been described above.

Figure 4:
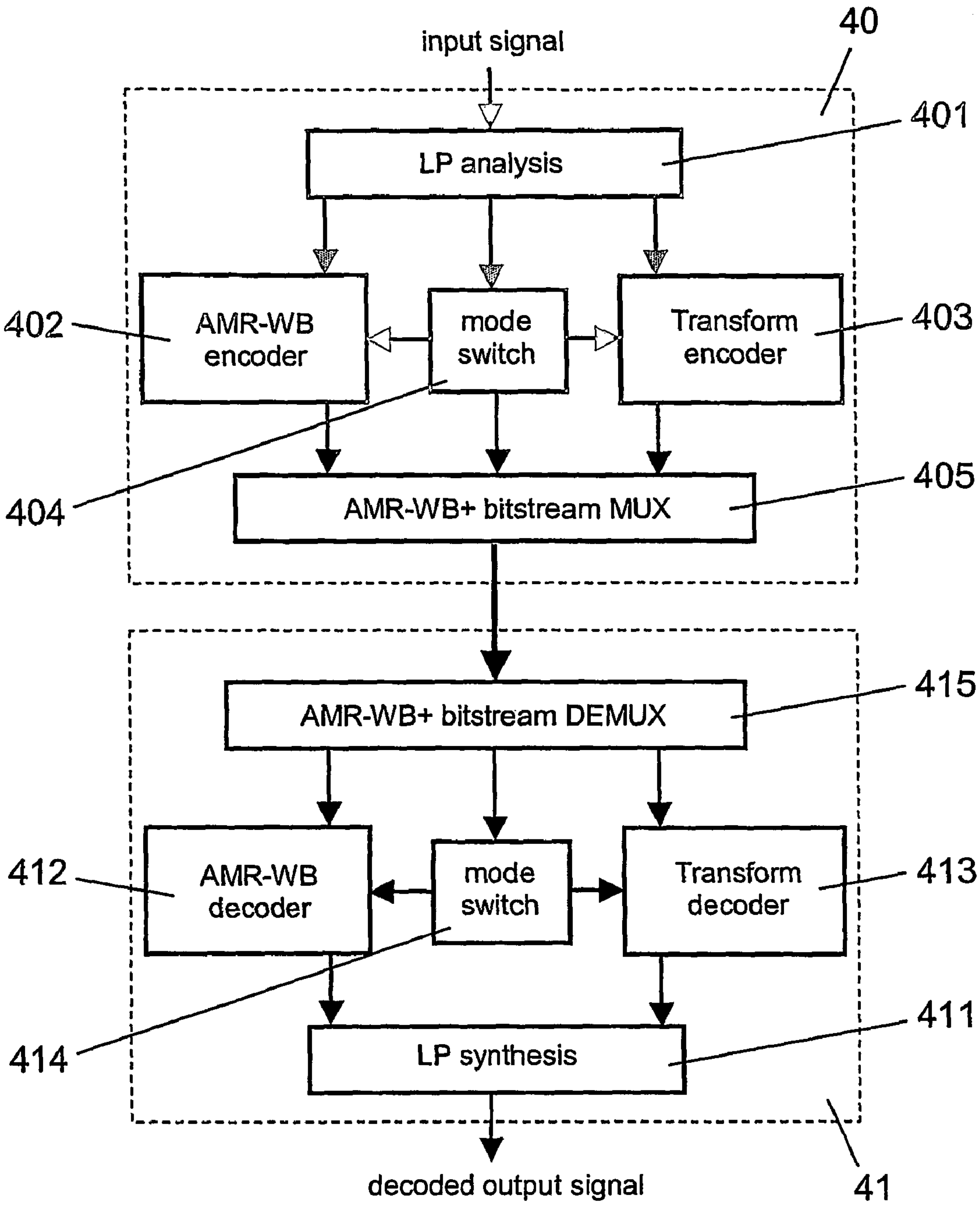
FIG. 4 is a high level block diagram of a hybrid coding system in which an embodiment of the invention can be implemented.

FIG. 4 presents the general structure of a hybrid audio coding system, in which the invention can be implemented. The hybrid audio coding system can be employed for transmitting speech signals with a low bitrate and music signals with a high bitrate.

The hybrid audio coding system of FIG. 4 comprises to this end a hybrid encoder 40 and a hybrid decoder 41. The hybrid encoder 40 encodes audio signals and transmits them to the hybrid decoder 41, while the hybrid decoder 41 receives the encoded signals, decodes them and makes them available again as audio signals. Alternatively, the encoded audio signals could also be provided by the hybrid encoder 40 for storage in a storing unit, from which they could then be retrieved again by the hybrid decoder 41.

The hybrid encoder 40 comprises an LP analysis portion 401, which is connected to an AMR-WB encoder 402, to a transform encoder 403 and to a mode switch 404. The mode switch 404 is also connected to the AMR-WB encoder 402 and the transform encoder 403. The AMR-WB encoder 402, the transform encoder 403 and the mode switch 404 are further connected to an AMR-WB+ (Adaptive Multi-Rate Wideband extension for high audio quality) bitstream multiplexer (MUX) 405.

The hybrid encoder 40 comprises an LP (linear prediction) analysis portion 401, which is connected to an AMR-WB encoder 402, to a transform encoder 403 and to a mode switch 404. The mode switch 404 is also connected to the AMR-WB encoder 402 and the transform encoder 403. The AMR-WB encoder 402, the transform encoder 403 and the mode switch 404 are further connected to an AMR-WB+ (Adaptive Multi-Rate Wideband extension for high audio quality) bitstream multiplexer (MUX) 405.

When an audio signal is to be transmitted, it is first input to the LP analysis portion 401 of the hybrid encoder 40. The LP analysis portion 401 performs an LP analysis on the input signal and quantizes the resulting LP parameters. The LP analysis is described in detail in the technical specification 3 GPP TS 26.190, "AMR Wideband speech codec; Transcoding functions", Release 5, version 5.1.0 (2001-12), as first step of an AMR-WB encoding process. The quantized LP parameters are used for obtaining an excitation signal which is forwarded to the AMR-WB encoder component 402 and to the transform encoder component 403. The quantized LP parameters are provided in addition to the mode switch 404.

Based on the received LP parameters, the mode switch 404 determines in a known manner on a frame-by-frame basis which encoder component 402, 403 should be used for encoding the current frame. The mode switch 404 informs the encoder components 402, 403 on the respective selection and provides in addition a corresponding indication in the form of a bitstream to the AMR-WB+ bitstream multiplexer (MUX) 405.

The AMR-WB encoder component 402 is selected by the mode switch 404 for encoding excitation signals resulting apparently from speech signals. Whenever the AMR-WB encoder component 402 receives from the mode switch 404 an indication that it has been selected for encoding the current signal frame, the AMR-WB encoder component 402 applies an AMR-WB encoding process to received excitation signals. Such an AMR-WB encoding process is described in detail in the above mentioned specification 3 GPP TS 26.190. Only an LP analysis, which forms in specification 3 GPP TS 26.190 part of the AMR-WB encoding process, has already been carried out separately in the LP analysis portion 401. The AMR-WB encoder component 402 provides the resulting bitstream to the AMR-WB+ bitstream MUX 405.

The transform encoder component 403 is selected by the mode switch 404 for encoding excitation signals resulting apparently from other audio signals than speech signals, in particular music signals. Whenever the transform encoder component 403 receives from the mode switch 404 an indication that it has been selected for encoding the current signal frame, the transform encoder component 403 employs a known MDCT with 50% window overlapping, as shown in FIG. 2, to obtain a spectral representation of the excitation signal. The known MDCT is modified, however, for the transitions from the AMR-WB coding scheme to the MDCT coding scheme, as will be described in more detail further below. The obtained spectral components are quantized, and the resulting bitstream is equally provided to the AMR-WB+ bitstream MUX 405.

The AMR-WB+ bitstream MUX 405 multiplexes the received bitstreams to a single bitstream and provides them for transmission.

At the decoder side of the hybrid audio coding system, reverse operations are performed.

The AMR-WB+ bitstream DEMUX 415 of the hybrid decoder 41 receives a bitstream transmitted by the hybrid encoder 40 and demultiplexes this bitstream into a first bitstream, which is provided to the AMR-WB decoder component 412, a second bitstream, which is provided to the transform decoder component 413, and a third bitstream, which is provided to the mode switch 414.

Based on the indication in the received bitstream, the mode switch 411 selects on a frame-by-frame basis the decoder component 412, 413 which is to carry out the decoding of a particular frame and informs the respective decoder component 412, 413 by a corresponding signal.

The AMR-WB decoding process which is performed by the AMR-WB decoder component 412 when selected is described in detail in the above mentioned specification 3 GPP TS 26.190. An LP synthesis, which is described in specification 3 GPP TS 26.190 as part of the AMR-WB decoding process, follows separately in the LP synthesis portion 411, to which the AMR-WB decoder component 412 provides the LP parameters resulting in the decoding.

The transform decoder component 413 applies a known IMDCT when selected. The known IMDCT is modified, however, for the transitions from the AMR-WB coding scheme to the MDCT decoding scheme, as will be described in more detail further below. The transform decoder component 413 provides the LP parameters resulting in the decoding equally to the LP synthesis portion 411.

The LP synthesis portion 411, finally, performs an LP synthesis as described in detail in the above mentioned specification 3GPP TS 26.190 as the last processing step of an AMR-WB decoding process. The resulting restored audio signal is then provided for further use.

This AMR-WB extended coder framework is also referred to as AMR-WB+.

A known MDCT based encoding and a known IMDCT based decoding are described in detail for example by J. P. Princen and A. B. Bradley in "Analysis/synthesis filter bank design based on time domain aliasing cancellation", IEEE Trans. Acoustics, Speech, and Signal Processing, 1986, Vol. ASSP-34, No. 5, October 1986, pp. 1153-1161, and by S. Shlien in "The modulated lapped transform, its time-varying forms, and its applications to audio coding standards", IEEE Trans. Speech, and Audio Processing, Vol. 5, No. 4, July 1997, pp. 359-366.

The analytical expression for the regular forward MDCT of a $k^{th}$ coding frame is given by the equation:

$$X_k(m) = \frac{1}{N}\cdot\sum_{i=0}^{N-1} f(i)\cdot x_k(i)\cdot\cos\left(\frac{\pi}{N}\left(2i+1+\frac{N}{2}\right)(2m+1)\right),\quad m=0,\ \dots\ ,N/2-1, \tag{1}$$

where N is the length of the signal segment, i.e. the number of samples per frame, where f(i) defines the analysis window and where $x_k(i)$ are the samples of the excitation signal provided by the LP analysis portion 401 to the transform encoder component 403.

The analytical expression for the regular inverse MDCT for the $k^{th}$ coding frame is given by the equation:

$$q_k(m) = \sum_{i=0}^{N/2-1} h(m)\cdot X_k(i)\cdot\cos\left(\frac{\pi}{N}\left(2m+1+\frac{N}{2}\right)(2i+1)\right),\quad m=0,\ \dots\ ,N-1, \tag{2}$$

where N is again the length of the signal segment and where h(m) defines the synthesis window.

The reconstructed $k^{th}$ frame can be retrieved by an overlap-add according to the equation:

$$\tilde{x}_k(m) = q_{k-1}\left(m+\frac{N}{2}\right)+q_k(m),\ m=0,\ \dots\ ,N/2-1, \tag{3}$$

where $\tilde{x}_k(m)$ constitute the samples which are provided by the transform decoder component 413 to the LP synthesis portion 411.

The analysis and synthesis windows f(n) and h(n) satisfy the following constraints of perfect reconstruction:

$$f(n)=h(n),\ n=0,\ \dots\ ,N/2-1$$

$$h(N-1-n)=h(n)$$

$$h^2(n)+h^2(n+N/2)=1 \tag{4}$$

Perfect reconstruction ensures that any aliasing error introduced at the decimation stage is canceled during the reconstruction. In practice, perfect reconstruction cannot be maintained since the spectral values are quantized. Therefore, the filters should be designed in a way that the aliasing error is minimized. This goal can be achieved with filters having a sharp transition band and high stop-band attenuation.

A window which is frequently employed for the MDCT and the IMDCT is the sine window, since it satisfies the constraints of equation (3) and minimizes the aliasing error:

$$h(n) = \sin\left(\frac{\pi}{N}\cdot(n+0.5)\right),\ n=0,\ \dots\ ,N-1. \tag{5}$$

The transform encoder component 403 and the transform decoder component 413 of the hybrid audio coding system of FIG. 4 employ the above equations (1), (2), (3) and (5) for all frames but those following immediately after a frame that was coded by AMR-WB.

For these transition frames, a special window sequence is defined, which satisfies the constraints for the analysis and synthesis windows and which achieves at the same time a smooth transition between AMR-WB and the MDCT based transform codec.

Figure 5:
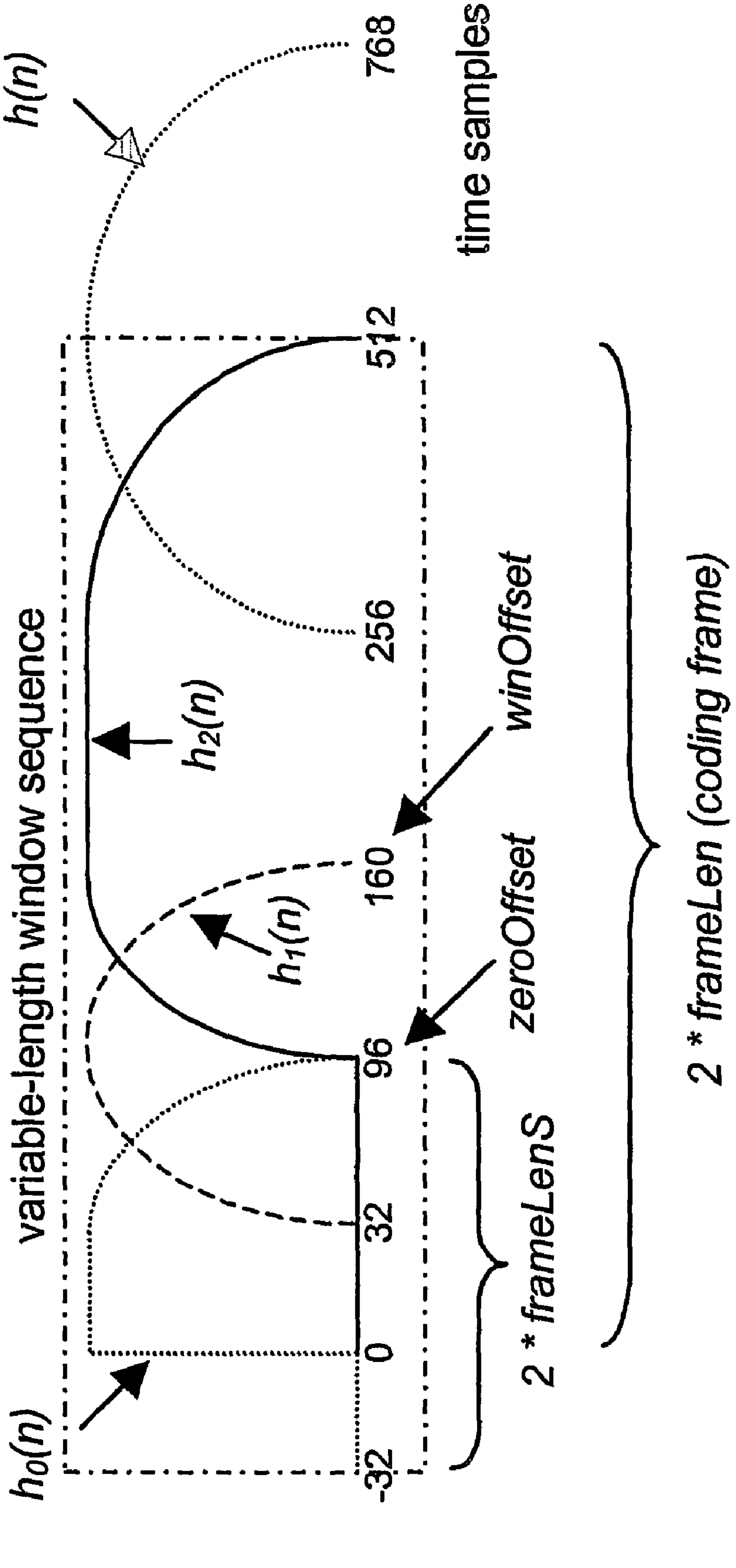
FIG. 5 illustrates a window sequence employed in the embodiment of the invention.

The definition of this window sequence will now be presented with reference to FIG. 5. FIG. 5 is a diagram depicting an exemplary window sequence over samples in the time domain, a sample numbered '0' representing the first sample of the current coding frame. It is to be noted that the representation of the samples is not linear.

The length of the frame in samples present in the MDCT domain is denoted as frameLen. The length of the frame in the time domain is 2*frameLen, i.e. N=2*frameLen. In the example of FIG. 5, there are 256 samples per frame in the MDCT domain, i.e. frameLen=256, and thus 512 samples per coding frame in the time domain. Two consecutive coding frames are overlapping by 256 samples in the time domain.

First, a subframe length is determined, which subframe length is denoted as frameLenS. The subframe length has to satisfy the following conditions:

$$\begin{cases} frameLenS < frameLen \\ frameLen \bmod frameLenS = 0 \\ frameLenS \bmod 2 = 0 \end{cases} \tag{6}$$

That is, the value frameLen is to be an entire multiple of the value frameLenS, and the value frameLenS is to constitute an even number. For the example of FIG. 5, frameLenS is defined to be equal to 64, which satisfies the above conditions (6).

Next, a first offset zeroOffset, a number of short windows numShortWins and a second offset winOffset are defined as helper parameters and calculated according to the following equations:

$$zeroOffset=(frameLen-frameLenS)/2 \quad (7)$$

$$numShortWins=\lfloor zeroOffset/frameLenS \rfloor$$

$$if(zeroOffset \bmod 2 \neq 0)$$

$$numShortWins=numShortWins+1 \quad (8)$$

$$winOffset=zeroOffset+frameLenS \quad (9)$$

where the expression $\lfloor x \rfloor$ in equation (8) indicates the largest integer smaller than x. The number of short windows numShortWins has to be even according to equation (8).

For the example of FIG. 5, zeroOffset is calculated to be 96, numShortWins is calculated to be 2 and winOffset is calculated to be 160.

The defined parameter values are all stored fixedly in the transform encoder component 403.

Based on the stored parameter values, the transform encoder component 403 calculates numShortWins forward MDCTs of a length of frameLenS and one forward MDCT of a length of frameLen for the current transition coding frame. Each MDCT is calculated according to above equation (1), in which the window f(n)=h(n) is substituted by new windows $h_0(n)$, $h_1(n)$ and $h_2(n)$, respectively.

The first MDCT window $h_0(n)$ has a shape according to the following equation:

$$h_0(n) = \begin{cases} 0 & 0 \le n < frameLenS/2 \\ 1 & frameLenS/2 \le n < frameLenS \\ \sin\left(\frac{\pi}{2 \cdot frameLenS} \cdot (n+0.5)\right) & frameLenS \le n < 2 \cdot frameLenS \end{cases} \quad (10)$$

In the example of FIG. 5, the first window $h_0(n)$ is equal to zero for samples −32 to −1, i.e. for all samples preceding the samples of the current coding frame. For the following samples 0 to 31, the first window $h_0(n)$ is equal to one. For the samples 32 to 95, it has a sine shape. Thus, the first window $h_0(n)$ is positioned within the coding frame so that it starts from time instant −32, while time instant 0 is the start of the coding frame. In equation (10), the first time sample from the coding frame is therefore multiplied with $h_0(32)$, the second sample with $h_0(33)$ etc. Since the values of $h_0(0)$ to $h_0(31)$ are all equal to zero, the time samples that correspond to time instants −31 to −1 are not needed. Whatever value they may have, the results of the multiplication would always be equal to zero.

The next numShortWins−1 MDCTs are calculated by the transform encoder component 403 based on the following window shape:

$$h_1(n) = \sin\left(\frac{\pi}{2 \cdot frameLenS} \cdot (n+0.5)\right) \text{ with } 0 \le n < 2 \cdot frameLenS \quad (11)$$

This equation thus corresponds to equation (5), in which N was substituted by 2*frameLenS. In the example of FIG. 5, there is a single window following equation (11), and this window $h_1(n)$ is positioned within the coding frame so that it starts from time instant 32 and ends with time instant 159.

Finally, the transform encoder component 403 calculates the MDCT of the length frameLen using the following window shape:

$$h_2(n) = \begin{cases} 0 & 0 \le n < zeroOffset \\ \sin\left(\frac{\pi \cdot (n - zeroOffset + 0.5)}{2 \cdot frameLenS}\right) & zeroOffset \le n < winOffset \\ 1 & winOffset \le n < frameLen \\ \sin\left(\frac{\pi \cdot (n+0.5)}{2 \cdot frameLen}\right) & frameLen \le n < 2 \cdot frameLen \end{cases} \quad (12)$$

In the example of FIG. 5, the last window $h_2(n)$ is equal to zero for samples 0 to 95, it has a modified sine shape like the first half of window $h_1(n)$ for samples 96 to 159, and it is equal to one for samples 160 to 259. The last part of the window from samples 259 to 511 is equal to the window employed for all other frames than the transition frames. Thus, this window $h_2(n)$ is positioned to cover exactly the entire coding frame.

The last window h(n) indicated in FIG. 5 belongs already to the subsequent coding frame, which is overlapping by 256 samples with the current transition coding frame.

On the whole, the described determination of the window sequence allows a variable length windowing scheme, which depends on the frame length frameLen and on the selected length of the subframesframeLenS.

The application of the described window sequence to a received coding frame results in frameLen+numShortWins*frameLenS spectral samples, i.e. in the example of FIG. 5 in 384 spectral samples. The spectral samples are then quantized by the transform encoder component 403 and provided as a bitstream to the AMR-WB+ bitstream MUX 405 of the encoder 40.

At the receiver side the same window sequence is applied by the transform decoder component 413 of the hybrid decoder 41 for calculating separate IMDCTs according to the above equation (2) to obtain the reconstructed output signal for that frame. No knowledge is required about an overlap component from the previous frame.

The above presented special window sequence is valid only for the duration of a current frame, in case the previous frame was coded with the AMR-WB coder 402, 412 and in case the current frame is coded with the transform coder 403, 413. The special window sequence is not applied for the following frame anymore, regardless of whether the next frame is coded by the AMR-WB coder 402, 412 or the transform coder 403, 413. If the next frame is coded by the transform coder 403, 413, the conventional window sequence is used.

It is to be noted that the described embodiment constitutes only one of a variety of possible embodiments of the invention.

The invention claimed is:

1. A method for encoding a signal, the method comprising:

encoding, via a first encoding device, a first frame of a signal according to a first coding scheme; and encoding, via a second encoding device, a second frame of the signal according to a modified discrete cosine transform (MDCT) coding scheme, wherein the second frame immediately follows the first frame, and wherein the encoding the second frame comprises:

defining a sequence of windows for the second frame, wherein the sequence of windows facilitates a transition between the first coding scheme and the MDCT coding scheme; and producing spectral samples of the signal by calculating a MDCT for each window of the sequence of windows;

wherein the shape of a second window of the sequence of windows is based at least in part on a number of samples of a subframe of the second frame;

wherein a length of the second frame is an integer multiple of a length of the subframe of the second frame, and wherein the length of the subframe of the second frame is an even number of samples.

2. The method of claim 1, wherein the sequence of windows comprises a first window, the second window, and a third window.

3. The method of claim 2, wherein a second half of the third window is identical to a second half of a subsequent window defined to encode a subsequent frame of the signal according to the MDCT coding scheme.

4. The method of claim 2, wherein the second window has a shaping according to an equation:

$$h1(n) = \sin\left(\frac{\pi}{2 * frameLenS} * (n + 0.5)\right),$$

wherein 0≦n≦2*frameLenS;

wherein n is a sample of the second frame, and wherein frameLenS is the number of samples per the subframe.

5. The method of claim 2, wherein the second window is overlapped by the first window, and wherein the first window has a shape according to an equation:

$$h0(n) = \begin{Bmatrix} 0 & 0 \le n < frameLenS/2 \\ 1 & \ldots frameLenS/2 \le n < frameLenS \\ \sin\left(\frac{\pi}{2 * frameLenS} * (n + 0.5)\right) & frameLenS \le n < 2 * frameLenS \end{Bmatrix}$$

wherein n is a sample of the second frame, and wherein frameLenS is the number of samples per the subframe.

6. The method of claim 2, wherein the second window is overlapped by the third window, and wherein the third window has a shape according to an equation:

$$h2(n) = \begin{Bmatrix} 0 & 0 \le n < zeroOffset \\ \sin\left(\frac{\pi * (n - zeroOffset + 0.5)}{2 * frameLenS}\right) & zeroOffset \le n < winOffset \\ & \ldots \\ 1 & winOffset \le n < frameLen \\ \sin\left(\frac{\pi * (n + 0.5)}{2 * frameLen}\right) & frameLen \le n < 2 * frameLen \end{Bmatrix}$$

wherein n is a sample of the second frame, wherein frameLenS is the number of samples per the subframe, wherein frameLen is a number of samples per the second frame, wherein zeroOffset is equal to (frameLen−frameLenS)/2, and wherein winOffset is equal to zeroOffset+frameLenS.

7. The method of claim 2, wherein a length of the first and second windows corresponds to an even number of samples, and wherein the length of the third window is an integer multiple of the lengths of the first and second windows.

8. The method of claim 1, further comprising performing linear prediction analysis on the signal, wherein the linear prediction analysis produces signals to indicate the coding scheme to be used on each frame of the signal.

9. The method of claim 1, further comprising quantizing the spectral samples of the signal into a bitstream.

10. The method of claim 1, further comprising multiplexing, via a multiplexer, bitstreams produced by the first coding scheme and the second coding scheme into a single bitstream, wherein the single bitstream includes an indication of a type of coding scheme applied to each frame of the signal.

11. The method of claim 1, wherein the first coding scheme is an adaptive multi-rate wideband (AMR-WB) coding scheme.

12. A method for decoding a signal, the method comprising:

decoding, via a first decoding device, a bitstream of a first frame of a signal according to a first coding scheme; and decoding, via a second decoding device, a bitstream of a second frame of the signal according to a modified discrete cosine transform (MDCT) coding scheme, wherein the second frame immediately follows the first frame, and wherein the decoding the second bitstream comprises:

defining a sequence of windows for the bitstream of the second frame, wherein the sequence of windows facilitates a transition between the first coding scheme and the MDCT coding scheme; and producing samples of the signal by calculating an inverse MDCT for each window of the sequence of windows;

wherein the shape of a second window of the sequence of windows is based at least in part on a number of samples of a subframe of the second frame;

wherein a length of the second frame is an integer multiple of a length of the subframe of the second frame, and wherein the length of the subframe of the second frame is an even number of samples.

13. The method of claim 12, wherein the sequence of windows comprises a first window, the second window, and a third window.

14. The method of claim 13, wherein the second window has a shaping according to an equation:

$$h1(n) = \sin\left(\frac{\pi}{2 * frameLenS} * (n + 0.5)\right),$$

wherein 0≦n≦2*frameLenS;

wherein n is a sample of the second frame, and wherein frameLenS is the number of samples per the subframe.

15. The method of claim 13, wherein the second window is overlapped by the first window, and wherein the first window has a shape according to an equation:

$$h0(n) = \begin{Bmatrix} 0 & 0 \le n < frameLenS/2 \\ 1 & \ldots frameLenS/2 \le n < frameLenS \\ \sin\left(\frac{\pi}{2 * frameLenS} * (n + 0.5)\right) & frameLenS \le n < 2 * frameLenS \end{Bmatrix}$$

wherein n is a sample of the second frame, and wherein frameLenS is the number of samples per the subframe.

16. The method of claim 13, wherein the second window is overlapped by the third window, and wherein the third window has a shape according to an equation:

$$h2(n) = \begin{cases} 0 & 0 \le n < zeroOffset \\ \sin\left(\frac{\pi * (n - zeroOffset + 0.5)}{2 * frameLenS}\right) & zeroOffset \le n < winOffset \\ \ldots & \\ 1 & winOffset \le n < frameLen \\ \sin\left(\frac{\pi * (n + 0.5)}{2 * frameLen}\right) & frameLen \le n < 2 * frameLen \end{cases}$$

wherein n is a sample of the second frame, wherein frameLenS is the number of samples per the subframe, wherein frameLen is a number of samples per the second frame, wherein zeroOffset is equal to (frameLen−frameLenS)/2, and wherein winOffset is equal to zeroOffset+frameLenS.

17. The method of claim 13, wherein a length of the first and second windows corresponds to an even number of samples, and wherein the length of the third window is an integer multiple of the lengths of the first and second windows.

18. The method of claim 12, further comprising demultiplexing, via a demultiplexer, a single bitstream into a first bitstream, a second bitstream, and a third bitstream, wherein the first bitstream is received at the first decoder, wherein the second bitstream is received at the second decoder, and wherein the third bitstream indicates a type of coding scheme to be applied to each component of the first bitstream and the second bitstream.

19. The method of claim 12, wherein the first coding scheme is an adaptive multi-rate wideband (AMR-WB) coding scheme.

20. The method of claim 12, further comprising performing linear prediction synthesis on the samples of the signal, wherein the linear prediction synthesis produces a restored signal.

21. A hybrid encoding device comprising:

a first encoding device configured to encode a first frame of a signal according to a first coding scheme;

a second encoding device configured to encode a second frame of the signal according to a MDCT coding scheme, wherein the second frame immediately follows the first frame, and wherein the second encoding device is further configured to:

define a sequence of windows for the second frame, wherein the sequence of windows facilitates a transition between the first coding scheme and the MDCT coding scheme; and produce spectral samples of the signal by calculating a MDCT for each window of the sequence of windows; and a switch coupled to the first and second encoding devices, wherein the switch is configured to select one of the first or second encoding devices on a frame-by-frame basis according to a type of the signal;

wherein the shape of the second window is based at least in part on a number of samples of a subframe of the second frame;

wherein a length of the second frame is an integer multiple of a length of the subframe of the second frame, and wherein the length of the subframe of the second frame is an even number of samples.

22. An encoder component comprising:

a hardware module configured to encode a second frame of a signal according to a MDCT coding scheme, wherein the second frame immediately follows a first frame of the signal, and wherein the module comprises:

a first hardware component configured to define a sequence of windows for the second frame, wherein the sequence of windows facilitates a transition between a first coding scheme and the MDCT coding scheme; and a second hardware component configured to produce spectral samples of the signal by calculating a MDCT for each window of the sequence of windows;

wherein the shape of a second window of the sequence of windows is based at least in part on a number of samples of a subframe of the second frame;

wherein a length of the second frame is an integer multiple of a length of the subframe of the second frame, and wherein the length of the subframe of the second frame is an even number of samples.

23. A hybrid decoding device comprising:

a first decoding device configured to decode a bitstream of a first frame of a signal according to a first coding scheme;

a second decoding device configured to decode a bitstream of a second frame of the signal according to a MDCT coding scheme, wherein the second frame immediately follows the first frame, and wherein the second decoding device is further configured to:

define a sequence of windows for the second coding frame, wherein the sequence of windows facilitates a transition between the first coding scheme and the MDCT coding scheme; and produce spectral samples of the signal by calculating an inverse MDCT for each window of the sequence of windows; and a switch coupled to the first and second decoding devices, wherein the switch is configured to select one of the first or second decoding devices on a frame-by-frame basis according to a third bitstream of the signal;

wherein the shape of a second window of the sequence of windows is based at least in part on a number of samples of a subframe of the second frame;

wherein a length of the second frame is an integer multiple of a length of the subframe of the second frame, and wherein the length of the subframe of the second frame is an even number of samples.

24. A decoder component comprising:

a hardware module configured to decode a bitstream of a second frame of a signal according to a MDCT coding scheme, wherein the second frame immediately follows a first frame of the signal, and wherein the module comprises:

a first hardware component configured to define a sequence of windows for the second frame, wherein the sequence of windows facilitates a transition between a first coding scheme and the MDCT coding scheme; and a second hardware component configured to produce spectral samples of the signal by calculating an inverse MDCT for each window of the sequence of windows;

wherein the shape of a second window of the sequence of windows is based at least in part on a number of samples of a subframe of the second frame;

wherein a length of the second frame is an integer multiple of a length of the subframe of the second frame, and wherein the length of the subframe of the second frame is an even number of samples.

25. A coding system comprising:

a hybrid encoding device comprising:

a first encoding device configured to encode a first frame of a signal according to a first coding scheme;

a second encoding device configured to encode a second frame of the signal according to a MDCT coding scheme, wherein the second frame immediately follows the first frame, and wherein the second encoder is further configured to:

define a first sequence of windows for the second frame, wherein the first sequence of windows facilitates a transition between the first coding scheme and the MDCT coding scheme; and produce a first plurality of spectral samples of the signal by calculating a MDCT for each window of the sequence of windows; and a switch coupled to the first and second encoding devices, wherein the switch is configured to select one of the first or second encoders on a frame-by-frame basis according to a type of the signal; and a hybrid decoding device comprising:

a first decoding device configured to decode a bitstream of a first frame of a signal according to a first coding scheme;

a second decoding device configured to decode a bitstream of a second frame of the signal according to a MDCT coding scheme, wherein the second frame immediately follows the first frame, and wherein the second decoding device is further configured to:

define a second sequence of windows for the second coding frame, wherein the second sequence of windows facilitates a transition between the first coding scheme and the MDCT coding scheme; and produce a second plurality of spectral samples of the signal by calculating an inverse MDCT for each window of the sequence of windows; and a switch coupled to the first and second decoding devices, wherein the switch is configured to select one of the first or second decoding devices on a frame-by-frame basis according to a third bitstream of the signal;

wherein the shape of a second window of the sequence of windows is based at least in part on a number of samples of a subframe of the second frame;

wherein a length of the second frame is an integer multiple of a length of the subframe of the second frame, and wherein the length of the subframe of the second frame is an even number of samples.

26. A hybrid encoding device comprising:

means for encoding a first frame of a signal according to a first coding scheme;

means for encoding a second frame of the signal according to a MDCT coding scheme, wherein the second frame immediately follows the first frame;

means for defining a sequence of windows for the second frame, wherein the sequence of windows facilitates a transition between the first coding scheme and the MDCT coding scheme;

means for producing spectral samples of the signal by calculating a MDCT for each window of the sequence of windows; and means for selecting an encoding means on a frame-by-frame basis according to a type of the signal;

wherein the shape of a second window of the sequence of windows is based at least in part on a number of samples of a subframe of the second frame;

wherein a length of the second frame is an integer multiple of a length of the subframe of the second frame, and wherein the length of the subframe of the second frame is an even number of samples.

27. A non-transitory computer-readable medium having computer readable instructions stored thereon that, when executed by a processor, cause a computing device to:

encode a second frame of a signal according to a MDCT coding scheme, wherein the second frame immediately follows a first frame of the signal;

define a sequence of windows for the second coding frame, wherein the sequence of windows facilitates a transition between a first coding scheme and the MDCT coding scheme; and produce spectral samples of the signal by calculating a MDCT for each window of the sequence of windows;

wherein the shape of a second window of the sequence of windows is based at least in part on a number of samples of a subframe of the second frame;

wherein a length of the second frame is an integer multiple of a length of the subframe of the second frame, and wherein the length of the subframe of the second frame is an even number of samples.

* * * * *

UNITED STATES PATENT AND TRADEMARK OFFICE

CERTIFICATE OF CORRECTION

PATENT NO. : 7,876,966 B2
APPLICATION NO. : 10/548235
DATED : January 25, 2011
INVENTOR(S) : Ojanpera It is certified that error appears in the above-identified patent and that said Letters Patent is hereby corrected as shown below:

Column 11, line 24, in Claim 4, delete "$0 \leqq n \leqq 2$" and insert -- $0 \leqq n < 2$ --.

Column 12, line 5, in Claim 10, delete "claim 1," and insert -- claim 9, --.

Column 12, line 48, in Claim 14, delete "$0 \leqq n \leqq 2$" and insert -- $0 \leqq n < 2$ --.

Signed and Sealed this
Twenty-first Day of June, 2011

David J. Kappos
*Director of the United States Patent and Trademark Office*